(No Model.)
F. H. SMITH.
CAR WHEEL.
No. 266,061. Patented Oct. 17, 1882.
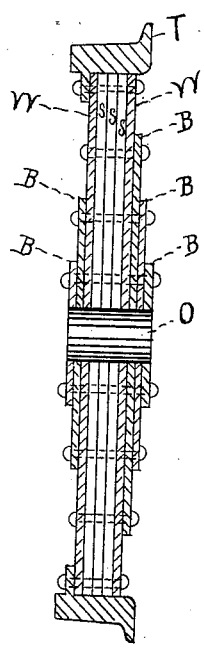
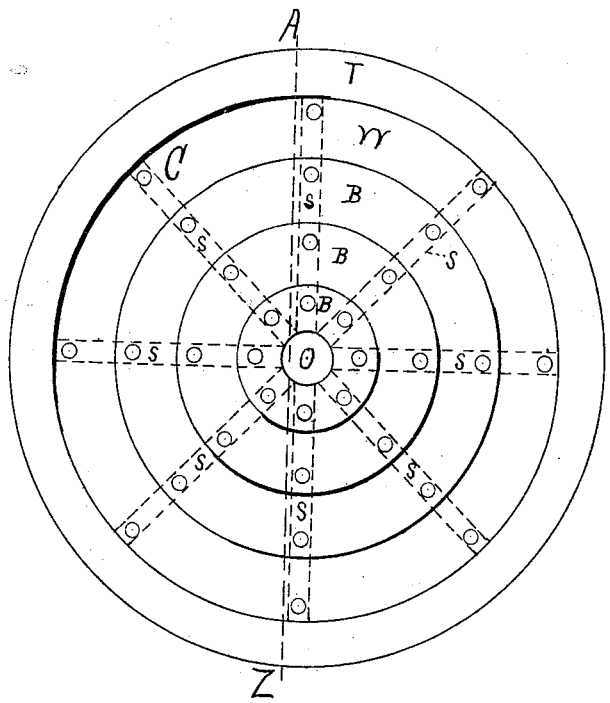
WITNESSES
C. H. Latrobe
A. S. Barroll
INVENTOR
Frederick H. Smith

UNITED STATES PATENT OFFICE.

FREDERICK H. SMITH, OF ST. DENIS, MARYLAND.

CAR-WHEEL.

SPECIFICATION forming part of Letters Patent No. 266,061, dated October 17, 1882.

Application filed August 26, 1882. (No model.)

*To all whom it may concern:*

Be it known that I, FREDERICK H. SMITH, a citizen of the United States, residing at St. Denis, county of Baltimore, State of Maryland, have invented a new and useful Improvement in Car-Wheels, of which the following is a specification.

My invention relates to car-wheels having wrought iron or steel "centers" combined with steel tires, and the following specification and the accompanying drawings will explain the nature of my invention and manner of carrying it into effect.

Figure 1 in the accompanying drawings is a side view of a car-wheel constructed according to my invention, and Fig. 2 is a cross-section of the same upon the line A Z.

The tire T is bolted to the periphery of my improved center C. This center is composed of the annular web-plates W W, riveted to the spokes S S in the inside of the wheel, and to the boss-plates B B on the outside of the wheel. The central hole, O, is to receive the axle with a tight fit.

The great desideratum in car-wheels is the elimination of cast metal on account of its dangerous brittleness and liability to strains in cooling; but as yet the best wheels in use contain separate hubs of cast metal interposed between the axle and the inner edges of annular webs of wrought metal or paper. My invention does away with separate hubs of either wrought or cast metal by extending the inner ends of the spokes and the inner edges of the annular boss-plates and web-plates to the axle-hole, where they rest their solid metal upon the axle when in place, and where they also form component portions of a hub-shaped mass not separated from the web.

The tire may be attached as shown, or by shrinking, or by other reliable method. Bolts and rivets may replace each other at all points. Boss-plates may vary in number, or may be omitted when the wheel is sufficiently thick without them. Spokes may be made of channels or beams or other suitable shape; but the flat bars shown in the drawings are preferable. A third web-plate may be inserted in the center of the wheel for large diameters; and the wheel may be used as a driving-wheel by riveting on annular boss-plates at proper points for insertion of crank-pins.

I do not claim as being novel in itself the extension of the spokes inwardly to a bearing upon the axle, as this is a common feature in the construction of the wheels of best American wheelbarrows, and also of the driving-wheels of locomotives on the North British railway of England, and also in the car-wheel devised by G. W. Miltimore; but these are all open-spoke wheels, carrying their loads upon the spokes only, whereas my invention produces a closed annular box-wheel in which the bulk of the load is upon the web-plates which support the tire between the spokes.

I claim—

A car-wheel having a center composed of wrought iron or steel annular web-plates which extend from the tire to the axle-hole and are stiffened by and combined with wrought iron or steel spokes bolted or riveted in between the web-plates.

FREDERICK H. SMITH.

Witnesses:
C. H. LATROBE,
A. S. BARROLL.